United States Patent Office 3,313,700
Patented Apr. 11, 1967

3,313,700
METHOD OF TREATING THE CENTRAL NERVOUS SYSTEM WITH SUBSTITUTED PHENETHYL CARBAMATES AND COMPOSITIONS THEREFOR
Charles D. Bossinger, Olympia Fields, and Kelley G. Taylor, Decatur, Ill., assignors to Armour Pharmaceutical Company, Chicago, Ill., a corporation of Delaware
No Drawing. Original application July 18, 1962, Ser. No. 210,818, now Patent No. 3,265,728, dated Aug. 9, 1966. Divided and this application June 6, 1966, Ser. No. 555,260
13 Claims. (Cl. 167—65)

This application is a divisional application of copending application Ser. No. 210,818, filed July 18, 1962, now U.S. Patent No. 3,265,728, which was a continuation-in-part of copending application Ser. No. 729,554, filed Apr. 21, 1958, and of Ser. No. 38,763, filed June 27, 1960, now abandoned. Application Ser. No. 38,763 was a continuation-in-part of application Ser. No. 729,553, filed Apr. 21, 1958, now abandoned, and applications Ser. Nos. 729,553 and 729,554 were continuations-in-part of parent application Ser. No. 554,132, filed Dec. 20, 1955, now abandoned.

This invention relates generally to compositions and methods for treating the central nervous system and more particularly to certain substituted phenethyl carbamate compounds and to a method of treating the central nervous system of animals, that is, mammals and fowls, especially man and domestic animals, by administering these compounds to such animals.

It is an object of this invention to provide substituted phenyl carbamate compounds for use in treating the central nervous system which exhibit special and distinctive properties and/or combinations of properties, including tranquilization, sedation, and muscle relaxation which shall herein be considered as "calming."

Further objects and advantages will be indicated in the following detailed specification.

The substituted phenyl carbamate compounds which are useful in the treatment of the central nervous system in accordance with the present invention are characterized by the following structural formula:

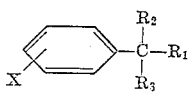

In the foregoing formula, $R_1$ is either carbamate or alkyl carbamate containing from 1 to 3 carbons in the alkyl group, and $R_2$ is either alkyl or hydroxy alkyl containing from 1 to 2 carbons. $R_2$ can also be hydrogen or hydroxy. $R_3$ is either hydrogen or alkyl containing from 1 to 2 carbons. X can be halogen, methyl, methoxy, phenyl, nitro, or amino. For example, the substituted phenyl may comprise p-nitrophenyl, p-bromophenyl, p-chlorophenyl, o-methoxyphenyl, m-methylphenyl, o-chlorophenyl, p-aminophenyl, 2,4-dichlorophenyl, 2,6-dichlorophenyl, o-aminophenyl, o-fluorophenyl, p-biphenyl, 3,4-dichlorophenyl, o-trifluoromethylbenzyl, pentachlorobenzyl, p-nitrobenzyl, m-nitrobenzyl, o-nitrobenzyl, m-methoxybenzyl, p-methoxybenzyl, p-fluorobenzyl, p-phenylbenzyl, etc.

With respect to the above formula, one preferred subclass of compounds is obtained where $R_1$ is carbamate, and $R_2$ and $R_3$ are hydrogen. These compounds are characterized by the structural formula:

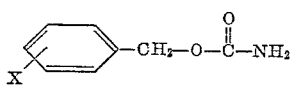

Specific examples of compounds coming within the sub-class represented by the above formula are: o-chlorobenzyl carbamate, 2,6-dichlorobenzyl carbamate, o-methylbenzyl carbamate, o-trifluoromethylbenzyl carbamate, pentachlorobenzyl carbamate, p-nitrobenzyl carbamate, m-nitrobenzyl carbamate, o-nitrobenzyl carbamate, o-methoxybenzyl carbamate, m-methoxybenzyl carbamate, p-methoxybenzyl carbamate, p-fluorobenzyl carbamate, p-chlorobenzyl carbamate, 2,4-dichlorobenzyl carbamate, m-chlorobenzyl carbamate, etc.

Again referring to the generic formula set out first above, another sub-class of compounds is obtained when $R_1$ is methyl carbamate, $R_2$ is hydroxy and $R_3$ is hydrogen. These compounds are represented by the following structural formula:

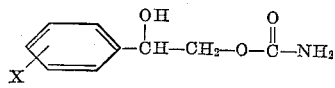

Examples of compounds coming within this sub-class are: 2-hydroxy-2-(p-nitrophenyl)-1-ethyl carbamate, 2-(p-bromophenyl)-2-hydroxy-1-ethyl carbamate, 2-(p-chlorophenyl)-2-hydroxy-1-ethyl carbamate, 2-hydroxy-2-(o-methoxyphenyl)-1-ethyl carbamate, 2-hydroxy-2-(o-methylphenyl)-1-ethyl carbamate, 2-hydroxy-2-(m-methylphenyl)-1-ethyl carbamate, 2-(o-chlorophenyl)-2-hydroxy-1-ethyl carbamate, 2-(p-aminophenyl)-2-hydroxy-1-ethyl carbamate, 2-(2,4-dichlorophenyl)-2-hydroxy-1-ethyl carbamate, 2-(2,6-dichlorophenyl)-2-hydroxy-1-ethyl carbamate, 2-(o-aminophenyl)-2-hydroxy-1-ethyl carbamate, 2-(o-fluorophenyl)-2-hydroxy-1-ethyl carbamate, 2-(p-biphenyl)-2-hydroxy-1-ethyl carbamate, 2-(3,4-dichlorophenyl)-2-hydroxy-1-ethyl carbamate, etc.

Referring again to the generic formula first set out above, still another sub-class of compounds is obtained when $R_1$ is alkylene carbamate wherein the alkylene contains from 1 to 3 carbons, and $R_2$ and $R_3$ are hydrogen. These compounds are represented by the following structural formula:

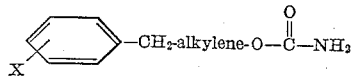

Specific examples of compounds coming within this sub-class are: 2-(p-chlorophenyl)-1-ethyl carbamate, 2-(o-chlorophenyl)-1-ethyl carbamate, 2-(2,4-dichlorophenyl)-1-ethyl carbamate, 2-(2,6-dichlorophenyl)-1-ethyl carbamate, 2-(p-methoxyphenyl)-1-ethyl carbamate, etc.

Still another sub-class of compounds is obtained when $R_1$ is carbamate, $R_2$ is methyl, and $R_3$ is hydrogen, referring again to the generic formula set out first above. These compounds can be represented by the following structural formula:

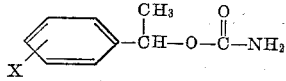

Specific examples of compounds coming within this subclass are: 1-(o-chlorophenyl)-1-ethyl carbamate, α-methyl-p-phenylbenzyl carbamate, 2,6-dichloro-α-methylbenzyl carbamate, etc.

A preferred sub-class of compounds is obtained when $R_1$ is alkylene carbamate, the alkylene containing from 1 to 3 carbon atoms, $R_2$ is hydroxy, and $R_3$ is alkyl containing from 1 to 3 carbons. These compounds are represented by the following structural formula:

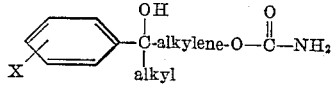

Specific examples of compounds coming within this sub-class are: 2-(p-chlorophenyl)-2-hydroxy butyl carbamate, 2-(o-chlorophenyl)-2-hydroxy butyl carbamate, 2-(2,6- dichlorophenyl)-2-hydroxy butyl carbamate, 2-(o-methoxyphenyl) - 2 - hydroxy butyl carbamate, 2-(p-bromophenyl)-2-hydroxy butyl carbamate, 2-(o-nitrobenzyl)-2-hydroxy butyl carbamate, 4-(p-chlorophenyl)-4-hydroxy hexyl-3-carbamate, and 2-(o - chlorophenyl)-4-hydroxy hexyl-3-carbamate.

A closely related group of compounds is obtained when hydrogen is substituted for the alkyl group in the formula last set out above. Specific examples of such compounds are: 1-(p-chlorophenyl)-1-hydroxy butyl-2-carbamate, 1-(o-chlorophenyl)-1-hydroxy butyl-2-carbamate, 1-(2,6-dichlorophenyl)-1-hydroxy butyl - 2 - carbamate, 1 - (o-methoxyphenyl)-1-hydroxy butyl - 2 - carbamate, 1-(p-bromophenyl)-1-hydroxy butyl-2-carbamate, 1-(o-nitrobenzyl)-1-hydroxy butyl-2-carbamate, 1-(p - chlorophenyl)-1-hydroxy pentyl-2-carbamate, and 1-(o-chlorophenyl)-1-hydroxy butyl-2-carbamate.

Another sub-class of compounds is represented by the following structural formula:

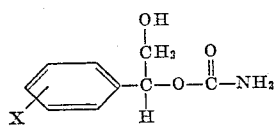

Specific examples of such compounds are: 1-(p-bromophenyl)-2-hydroxyethyl carbamate, 1-(p-chlorophenyl)-2-hydroxyethyl carbamate, 1 - (o-chlorophenyl) - 2 - hydroxyethyl carbamate, and 2-hydroxy - 1 - (o-methoxyphenyl) ethyl carbamate.

In all of the foregoing sub-generic formulas, the letter X has the same meaning ascribed to it in the generic formula set out first above. It will be further understood that X is not limited to a single substituent group, as illustrated by many of the foregoing specific compounds.

Many, if not all of the foregoing compounds can be prepared by the process described in copending application Ser. No. 161,739, filed Dec. 22, 1961, now abandoned. In that process the first step is the preparation of an organic cyclic carbonate from which the desired carbamate compound can be obtained. The cyclic carbonate can be made by disolving a substituted phenyl ethane diol in a dialkyl carbonate and heating this reaction mixture to evaporate the hydroxy alkyl reaction by-product. This leaves the organic cyclic carbonate reaction product as the residue. If desired, an alkali catalyst may be used. The cyclic intermediate is a substituted 4-phenyl ethylene carbonate, which is preferably reacted with ammonia to split the carbonate ring and form the desired carbamate. This procedure is described in great detail in the cited application Ser. No. 161,739.

Other processes can be used to prepare the substituted phenyl carbamates. In one such procedure, a 1,2-glycol is converted to the corresponding carbonate, and the carbonate is subjected to an ammonolysis to obtain the desired carbamate. This process was described in prior application Ser. No. 816,700, filed May 29, 1959, now U.S. Patent No. 3,066,164. Preferably, a 1,2-glycol is condensed with a halo-formic ester to obtain an acyclic carbonate which is then subjected to ammonolysis to obtain the monocarbamate. Since the particular process for preparing the carbamate compounds does not form a part of the present invention, it is not believed it will be necessary to further describe such processes herein, except that the preparation of specific carbamate compounds will be subsequently illustrated.

In utilizing the compounds of this invention for central nervous system treatment, it is preferred to administer the compounds orally. Since the compounds are well-absorbed orally, it will usually not be necessary to resort to parenteral administration. For oral administration, it is preferred to combine the carbamate compound with a pharmaceutical carrier. The proportions of the carrier and carbamate compound are not critical, and they vary considerably depending whether the composition is to be filled into capsules or formed into tablets. In tabletting, it will usually be desirable to employ at least as much of the pharmaceutical carrier as the carbamate compound. Various edible pharmaceutical carriers, or mixtures thereof can be used. For example, a mixture of lactose, dibasic calcium phosphate, and cornstarch is suitable. Additional ingredients can be included, such as lubricants like magnesuim stearate.

When administering the compounds of this invention orally for central nervous system treatment, the total daily dose will usually fall within the range from 400 to 2000 milligrams of the carbamate compound per 24 hour period. Typically, the daily dose will range from 600 to 1600 milligrams. In some cases, it may sometimes be desirable to administer as much as 2400 milligrams per day. In practicing the method of this invention, it will therefore be convenient to have the carbamate compound combined with a pharmaceutical carrier and prepared in tablets or other dosage unit form. Each tablet or dosage unit can contain from 50 to 600 miligrams of the carbamate compound. For example, tablets containing 200 milligrams of the carbamate compound can be administered either 1 tablet three times a day to achieve a daily dose of 600 milligrams or up to tablets four times a day to achieve a daily dose of 1600 milligrams.

The present invention is further illustrated by the following specific examples.

*Example 1*

1-(p-chlorophenyl)-1,2-butanediol 20 g. (0.1 mole), diethyl carbonate 12.1 ml. (0.1 mole), and potassium carbonate 0.1 g. were mixed in a round-bottom flask fitted with a Vigreux column. The reaction mixture was heated with an oil bath at approximately 150° C. The ethanol which was formed during the reaction was distilled. After the theoretical amount of ethanol was removed, the diethyl carbonate, if any, was distilled under reduced pressure.

The residue, when cooled to room temperature, was put into 300 ml. of methanol saturated with ammonia at 0° C. Occasional shaking was necessary to facilitate solution. The reaction mixture was left standing at room temperature overnight. The ammoniacal solution was filtered and the filtrate was concentrated under reduced pressure. The product was dried by azeotropic distillation with benzene. After benzene was removed, a slightly yellow semisolid was obtained. It was triturated with $CCl_4$ to give a white solid, 9.3 g. The solid was recrystallized twice from $CCl_4$ to crystals, 6.2 g. of 1-(p-chlorophenyl)-1-hydroxy-2-butyl carbamate.

*Example 2*

2-(p-biphenyl)-1,2-butanediol 24.2 g. (0.1 mole), diethyl carbonate 12.1 ml. (0.1 mole), and potassium carbonate 0.1 g. were mixed in a round-bottomed flask fitted with a Vigreux column. The reaction mixture was heated with an oil bath at approximately 150° C. The ethanol which was formed during the reaction was distilled. After the theoretical amount of ethanol was removed, the diethyl carbonate, if any, was distilled under reduced pressure.

The residue, when cooled to room temperature, was put into 300 ml. of methanol saturated with ammonia at 0° C. Occasional shaking was necessary to facilitate solution. The reaction mixture was left standing at room temperature overnight. The ammoniacal solution was filtered and the filtrate was concentrated under reduced pressure. The product was dried by azeotropic distillation with benzene. After benzene was removed, a yellow semi-solid was obtained. It was triturated with benzene to give a solid, 13.6 g. It was twice recrystallized to give crystals 10.5 g. of 2-(p-biphenyl)-2-hydroxybutyl carbamate.

Example 3

To α-methyl-p-phenylbenzyl alcohol, 19.8 g. (0.1 mole) in 40 ml. of pyridine was added slowly with stirring 15.6 g. of phenyl chloroformate (0.1 mole). After addition was completed, stirring was continued for three hours at room temperature. The reaction mixture was then decomposed by adding 100 ml. of cold water at ice bath temperature. The solid suspension originally present in pyridine dissolved and a white solid precipitated out again. It was isolated by suction filtration and air dried overnight.

This solid was placed in 250 ml. of anhydrous methanol saturated with ammonia in the cold. Occasional shaking was necessary to facilitate solution. The reaction mixture was left standing overnight.

The methanolic solution was filtered and concentrated under reduced pressure. A solid residue was obtained. It was washed with 4% NaOH thoroughly several times, filtered, and air dried. The crude product, 10.1 g., was recrystallized from benzene twice and then ethyl acetate, to give white crystals 2.5 g., M.P. 179–180.5° of α-methyl-p-phenylbenzyl carbamate.

Example 4

To 13.4 g. of ethyl carbamate (0.15 mole) in a round-bottomed flask fitted with a distillation setup were added 28.7 g. of 2-(2,6-dichlorophenyl) ethyl alcohol (0.15 mole) and 75 ml. of toluene. The system was heated so that water was driven off with toluene as an azeotrope. The reaction mixture was left to cool slightly. Aluminum isopropylate, 0.75 g. was then added. The oil bath was kept at 145–155° C. An azeotropic mixture of toluene and ethanol was distilled. Distillation was stopped when the head temperature dropped to 55°.

After toluene was removed under reduced pressure, a solid residue was obtained. It was dissolved in a minimum amount of hot chloroform and filtered off any insoluble material. After the filtrate was cooled down to room temperature, white needles formed and isolated by suction filtration. It was recrystallized from benzene to give needles, 12.3 g., M.P. 160.5–162.5°, yield 35.0%, of 2-(2,6-dichlorophenyl) ethyl carbamate.

Example 5

To 17.8 g. of ethyl carbamate (0.2 mole) in a round-bottomed flask fitted with a distillation setup were added 24.4 g. of o-methylbenzyl alcohol (0.2 mole) and 100 ml. of toluene. The system was heated so that water was driven off with toluene as an azeotrope. The reaction mixture was left to cool slightly. Aluminum isopropylate, 1.0 g., was then added. The oil bath was kept at 145–155°. An azeotropic mixture of toluene and ethanol was distilled. Distillation was stopped when the head temperature dropped to 55°.

After toluene was removed under reduced pressure, a solid residue was obtained. It was dissolved in hot chloroform and filtered off any insoluble material. The filtrate was concentrated under reduced pressure leaving a solid residue. It was recrystallized from carbon tetrachloride three times to give crystals, 12.6 g., M.P. 88–90°, yield 38.1% of o-methylbenzyl carbamate.

Example 6

To 17.8 g. of ethyl carbamate (0.2 mole) in a round-bottomed flask fitted with a distillation setup were added 28.5 g. of o-chlorobenzyl alcohol (0.2 mole) and 75 ml. of toluene. The system was heated so that water was driven off with toluene as an azeotrope. The reaction mixture was left to cool slightly. Aluminum isopropylate, 1.5 g., was then added. The oil bath was kept at 145–155°. An azeotropic mixture of toluene and ethanol was distilled. Distillation was stopped when the head temperature dropped to 55°.

After toluene was removed under reduced pressure, a slightly yellow solid residue was obtained. The residue was twice recrystallized from carbon tetrachloride to give crystals 16.7 g., M.P. 97–99°, yield 45.0%, of o-chlorobenzyl carbamate.

Example 7 p-Bromostyrene glycol 22 g. (0.1 mole) and 200 ml. of benzene were placed in a three-necked flask equipped in the usual manner. While stirring, 18 g. of phosgene in 110 ml. of benzene was added slowly in approximately 10 minutes. After an additional 50 minutes of stirring, 18 g. of diethyl aniline in 50 ml. of benzene was added. The reaction became exothermic when half of the diethylaniline was added. A cold water bath was used during the rest of the addition.

After an hour of stirring, the benzene solution was washed once with 250 ml. of cold water. It was then added to 180 ml. of 30% $NH_4OH$ in the cold. The reaction mixture was stirred for two hours. A white solid was isolated by filtration and air dried. The product weighed 18.5 g. and had a melting range of 68–140° (I). After standing for three days, a second crop of solid (II) was isolated from the water-benzene filtrate. (II) weighed 3.6 g., M.P. 158–161°. It was recrystallized from chloroform to give crystals 3.18 g., M.P. 162–164° of 2 - (p - bromophenyl) - 2 - hydroxy - 1 - ethyl carbamate.

(I) was dissolved in hot water, filtered, allowed to cool, and left standing for five hours. An oil precipitated out and solidified on standing. The solid (III) was isolated by filtration. It weighed 9.4 g., M.P. 86–125°. (III) was dissolved in $CHCl_3$. After chilling in an ice bath, a powdery material, 2.16 g., M.P. 154–159°, was obtained. The filtrate was concentrated to a volume of 125 ml. After chilling in an ice bath, crystals (IV) 4.12 g., M.P. 70–73°, were isolated. (IV) was dissolved in 450 ml. of benzene on the steam bath. After standing at room temperature overnight, clusters of crystals, 1-(p-bromophenyl) - 2 - hydroxy - 1 - ethyl carbamate 1.4 g., M.P. 99–101°, was obtained.

Example 8

Tablets for oral administration can be prepared from o-chlorobenzyl carbamate as follows: The compound is combined with a mixed pharmaceutical carrier in the ratio of 2 parts by weight of the carbamate compound per 3 parts of the pharmaceutical carrier. The mixed carrier contains dibasic calcium phosphate as the principal ingredient together with smaller amounts of lactose and 1 part of cornstarch. A small amount of magnesium stearate is also included.

The carbamate compound, the calcium phosphate, the lactose, and part of the magnesium stearate are blended and dry mixed until a uniform composition was obtained. This is formed into firm slugs no greater than ¼ inch thick. The slugs are then put through an oscillating granulator equipped with a 10 mesh screen. The cornstarch and a little more magnesium stearate is added at intervals while the slugs were being sized. The granulation is blended in a drum tumbler for 30 minutes. Following this, the granulation is compressed into tablets of 500 mg. per tablet containing 200 milligrams of the carbamate compound. This preparation acts on the central nervous system and lowers body temperature.

While in the foregoing specification, this invention has been described in relation to certain preferred embodiments, and many details have been set forth for purpose of illustration, it will be apparent to those skilled in the art that the invention is susceptible to additional embodiments, and that certain of the details set forth herein can be varied considerably without departing from the basic principles of the invention.

We claim:

1. A composition in dosage unit form for treating the central nervous system of animals to induce a calming effect comprising from about 50 to about 1600 milligrams of a substituted phenyl alkylcarbamate compound in admixture with a pharmaceutical carrier, said compound having the formula

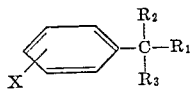

wherein: $R_1$ is carbamate or methylene carbamate; $R_2$ is alkyl containing from 1 to 2 carbons, hydroxy alkyl containing 1 to 2 carbons, hydroxy or hydrogen; $R_3$ is hydrogen or alkyl containing 1 to 2 carbons; and X is halogen, methyl, methoxy, phenyl, nitro and amino.

2. The composition of claim 1 wherein $R_1$ is carbamate and $R_2$ and $R_3$ are hydrogen.

3. The composition of claim 1 wherein $R_1$ is carbamate, $R_2$ is hydroxymethyl and $R_3$ is hydrogen.

4. The composition of claim 1 wherein $R_1$ is methylene carbamate and $R_2$ is hydroxy.

5. The composition of claim 1 wherein $R_1$ is methylene carbamate and $R_2$ and $R_3$ are hydrogen.

6. The method of treating the central nervous system of animals to obtain a calming effect therein comprising orally administering to said animals an effective amount of a substituted phenyl alkyl carbamate compound having the formula

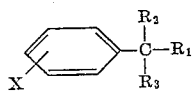

wherein: $R_1$ is carbamate or methylene carbamate; $R_2$ is alkyl containing 1 to 2 carbons, hydroxy alkyl containing 1 to 2 carbons, hydroxy or hydrogen; $R_3$ is hydrogen or alkyl containing 1 to 2 carbons; and X is halogen, methyl, methoxy, phenyl, nitro and amino.

7. The method of claim 6 wherein in said compound $R_1$ is carbamate and $R_2$ and $R_3$ are hydrogen.

8. The method of claim 6 wherein in said compound $R_1$ is methylene carbamate and $R_2$ is hydroxy.

9. The method of claim 8 wherein in said compound $R_3$ is hydrogen.

10. The method of claim 6 wherein in said compound $R_1$ is carbamate, $R_2$ is hydroxymethyl and $R_3$ is hydrogen.

11. The method of claim 6 wherein $R_1$ is methylene carbamate and $R_2$ and $R_3$ are hydrogen.

12. The composition of claim 1 wherein said compound is 2-(halophenyl)-2-hydroxyethyl carbamate or 2-(nitrophenyl)-2-hydroxyethyl carbamate or 2-(aminophenyl)-2-hydroxyethyl carbamate or 2-(methoxyphenyl)-2-hydroxyethyl carbamate or 2-(methylphenyl)-2-hydroxyethyl carbamate or 2-(phenylphenyl)-2-hydroxyethyl carbamate.

13. The method of claim 6 wherein said compound is 2-(halophenyl)-2-hydroxyethyl carbamate or 2-(nitrophenyl)-2-hydroxyethyl carbamate or 2-(aminophenyl)-2-hydroxyethyl carbamate or 2-(methoxyphenyl)-2-hydroxyethyl carbamate or 2-(methylphenyl)-2-hydroxyethyl carbamate or 2-(phenylphenyl)-2-hydroxyethyl carbamate.

No references cited.

SAM ROSEN, *Primary Examiner.*